United States Patent
Vippagunta et al.

(10) Patent No.: US 10,163,171 B1
(45) Date of Patent: Dec. 25, 2018

(54) PAYMENT TO A FRIEND THROUGH A SOCIAL NETWORKING SERVICE

(75) Inventors: Rajendra Kumar Vippagunta, Issaquah, WA (US); Jon T. Rogers, Seattle, WA (US); Artur Barbalho de Oliveira Souza, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1065 days.

(21) Appl. No.: 13/294,975

(22) Filed: Nov. 11, 2011

(51) Int. Cl.
G06Q 40/00 (2012.01)
G06Q 50/00 (2012.01)
G06Q 20/10 (2012.01)

(52) U.S. Cl.
CPC ............. G06Q 50/01 (2013.01); G06Q 20/10 (2013.01)

(58) Field of Classification Search
CPC ........ G06Q 40/00; G06Q 20/00; G06Q 20/34; G06Q 20/108; G06Q 50/01
USPC ......................................................... 705/39
See application file for complete search history.

(56) References Cited

U.S. PATENT DOCUMENTS

| | | | |
|---|---|---|---|
| 2008/0091610 A1* | 4/2008 | Benjamin | 705/52 |
| 2011/0251892 A1* | 10/2011 | Laracey | 705/14.51 |
| 2011/0276479 A1* | 11/2011 | Thomas | G06Q 20/102 705/40 |
| 2012/0078788 A1* | 3/2012 | Gandhi | 705/44 |
| 2012/0143761 A1* | 6/2012 | Doran et al. | 705/44 |
| 2012/0191606 A1* | 7/2012 | Milne | 705/44 |
| 2013/0013516 A1* | 1/2013 | Hamilton | 705/75 |

OTHER PUBLICATIONS

Friendster Users Can Now Send Money Via GCASH, PR Newswire Feb. 10, 2009: NA.*

* cited by examiner

Primary Examiner — Lalita M Hamilton
(74) Attorney, Agent, or Firm — Lee & Hayes, PLLC

(57) ABSTRACT

In various embodiments, a content provider may provide interactive content that is a part of a social networking service. One or more frames may be embedded within the interactive content, where the one or more frames may be provided by a payment application. The payment application may be configured to enable a user to view a list of friends; enable the user to select (i) a fund amount and (ii) a friend from the list of friends to transfer the fund amount from the user to the friend; and communicate, by bypassing the content provider, with a payment host to transfer the fund amount from the user to the friend without additional information about the friend.

24 Claims, 9 Drawing Sheets

WELCOME TO PQR SOCIAL NETWORKING WEBSITE

PAY-A-FRIEND BY XYZ

HELLO JIM,

YOUR XYZ PAYMENT ACCOUNT HAS BEEN CREDITED WITH $4.50 FROM YOUR FRIEND SMITH'S PAYMENT ACCOUNT.

THE CONFIRMATION NUMBER FOR THIS TRANSACTION IS 4786AGH.

THANK YOU FOR USING THE PAY-A-FRIEND SERVICE FROM XYZ

FIG. 4g

WELCOME TO PQR SOCIAL NETWORKING WEBSITE

PAY-A-FRIEND BY XYZ

PAYMENT CONFIRMATION

HELLO SMITH,

THANKS FOR TRANSFERRING $4.50 TO YOUR FRIEND JIM FROM YOUR PAYMENT ACCOUNT WITH XYZ.

YOU PAYMENT ACCOUNT HAS BEEN AWARDED 45 REWARDS POINTS, WHICH YOU MAY REDEEM IN FUTURE IN ACCORDANCE WITH THIS REWARDS CATALOGUE

FIG. 4h

WELCOME TO PQR SOCIAL NETWORKING WEBSITE

PAY-A-FRIEND BY XYZ

HELLO SMITH,

THE FOLLOWING FRIENDS HAVE AN UPCOMING EVENTS, WHICH YOU MAY CELEBRATE BY TRANSFERRING FUNDS TO THEM

| FRIENDS | EVENT | DATE |
|---|---|---|
| JOHN | BIRTHDAY | NOVEMBER 17 |
| JIM | MARRIAGE ANNIVERSARY | NOVEMBER 30 |

CLICK HERE TO SEND MONEY TO ONE OR MORE OF THE ABOVE FRIENDS

FIG. 4i

PAYMENT TO A FRIEND THROUGH A SOCIAL NETWORKING SERVICE

BACKGROUND

The World Wide Web is evolving rapidly and has, over the last decade, shifted from being a medium, in which information is mainly transmitted and consumed, into a platform where content is created, combined and shared among many users. Using a regular browser, users may now make online presentations, write blogs, collaborate in real-time, and share information about their daily activities using popular social networking services. Social networking services have become tremendously popular by having an ability to connect users and communities in a collaborative way, and serve as an advanced content sharing mechanism. Social networking services allow users to share ideas, activities, events, and interests within their individual network of friends and acquaintances.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 4a-4i illustrate user interfaces displayed on one or more client devices.

DETAILED DESCRIPTION

Overview

Figure 1:
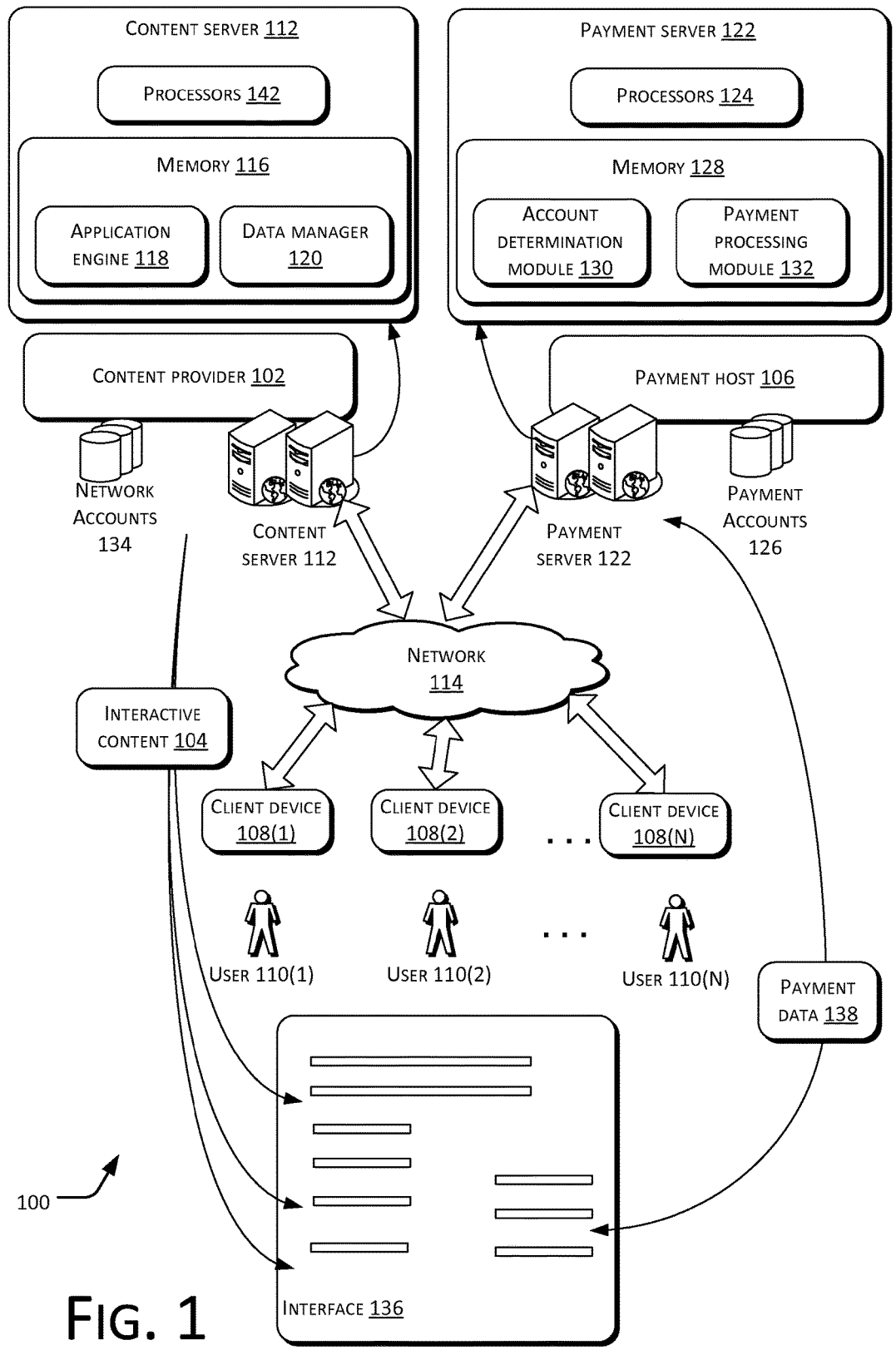
FIG. 1 shows a schematic diagram of an illustrative environment that includes a content provider that provides interactive content having an in-line payment process supported by a payment host.

In various embodiments, a content provider may generate interactive content for distribution to a user. The interactive content may be included in a social networking service. A user may, through the interactive content, generate and/or maintain a list of friends, connect with one or more friends included in the list of friends, and share interests, pictures, videos, e-mails, messages, and/or the like with the friends.

The user may desire to transfer funds (e.g., money, credits, etc.) to a friend from the list of friends. The user and the friend may use a first network account identification and a second network account identification, respectively, to access social network accounts provided by the content provider.

In an embodiment, a payment host, which may be different from the content provider, may provide a payment application to enable the user to transfer funds to the friend. The payment application may be provided to the user by the content provider via the interactive content. Once the user launches the payment application from the interactive content, one or more frames may be generated, which may be embedded within the interactive content. The user may enter the fund transfer request, using the payment application, through the one or more frames.

The one or more frames may be, for example, iframes, which may be overlaid with HyperText Markup Language (HTML) to protect the information in the iframes from being accessed by the content provider or other unauthorized users. The payment application may provide secure communication between the user's device and the payment host, thereby bypassing the content provider. The payment application may transmit the funds transfer request, including the first network account identification and the second network account identification, to the payment host. When the user and friend have payment accounts with the payment host, the payment host may map the first network account identification and the second network account identification to a first payment account and a second payment account maintained by the payment host for the user and the friend, respectively. The payment host may transfer funds from the first payment account of the user to the second payment account of the friend. This process may also be performed when the user and/or the friend do not have established payment account(s) with the payment host, when the user initiates the transfer. In these instances, the user and/or the friend may be required to create payment account(s) prior to transfer of funds from the user.

Thus, the user may be able to transfer funds to the friend directly from the social networking service, using the service of the payment host. To transfer the funds, the user need not know contact details (e.g., an e-mail address, a physical address, a telephone number, and/or the like) and/or a real name of the friend. The user can transfer funds to any friend in the list of friends that the user maintains in his or her social networking service account.

The techniques and systems described herein may be implemented in a number of ways. Example implementations are provided below with reference to the following figures.

Illustrative Environment and System

FIG. 1 shows schematic diagram of an illustrative environment 100 that includes a content provider 102 that provides interactive content 104 having an in-line payment process supported by a payment host 106.

In accordance with one or more embodiments, the content provider 102 may provide the interactive content 104 to a plurality of client devices 108(1), 108(2), . . . , 108(N), for access and interaction by a corresponding plurality of users 110(1), 110(2), . . . , 110(N), where N may be an appropriate integer. While in the environment 100, each user is illustrated to be associated to a corresponding client device (e.g., user 110(1) being associated with the client device 108(1)), in an embodiment (and although not illustrated in FIG. 1), a user can access more than one client device, and/or a client device can be accessed by more than one users, as will be readily understood by someone skilled in the art.

The client devices 108(1), . . . , 108(N) may include a personal computer, an electronic book reader (e-book reader), a tablet computer, a mobile telephone (including smart phones), a personal digital assistant (PDA), a television, a set top box, a gaming console, or another electronic, portable or handheld device.

The content provider 102 may include a content server 112 that processes and provides the interactive content 104 to the client devices 108(1), . . . , 108(N) via one or more network(s) 114. The network(s) 114 may be a wireless or a wired network, or a combination thereof. The network(s) 114 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless networks, wired networks, or a combination thereof.

In various embodiments, the interactive content 104 provided by the content provider 102 may be a part of a social networking service. The content provider 102 may provide content (e.g., files, music, messages, etc.), via the interactive content 104, for sharing and consumption by a user. For example, a user (e.g., user 110(1)) may access and interact with the interactive content 104 to identify and add another user in a list of friends of the user, and share interests, pictures, videos, e-mails, messages, and/or the like with the friends.

The content provider 102 may maintain a plurality of network accounts 134. For example, the content provider 102 may create and maintain a network account for a user (e.g., user 110(1)), which may be used by the user 110(1) via a secure sign-in process to access various features of the social networking service. For example, the user 110(1) may use social networking identification information (e.g., comprising a user name, a password, and/or the like) to securely access a corresponding network account (e.g., a social networking account, etc.) of the network accounts 134 maintained by the content provider 102.

The content server 112 may include one or more processors (e.g. processors 142) and memory 116 that stores various modules, applications, programs, or other data. The memory 116 may include instructions that, when executed by the processors 142 in the content server 112, cause the processors 142 to perform the operations described herein for the content provider 102. In some embodiments, the memory 116 may store an application engine 118 and a data manager 120. The application engine 118 may provide, render, and/or process the interactive content 104, and/or may run one or more applications on the content server 112. The data manager 120 may manage data, which may be used by the application engine 118 and consumed by the users 110(1), . . . , 110(N).

In various embodiments, the payment host 106 may be in communication with the content provider 102 and one or more of the client devices 108(1), . . . , 108(N). The payment host 106 may have a payment server 122 that processes payments and otherwise interacts with the content server 112 and/or one or more of the client devices 108(1), . . . , 108(N) via the network(s) 114.

In some embodiments, the payment host 106 may create and/or maintain a plurality of payment accounts 126. For example, the payment host 106 may create and maintain a payment account for the user 110(1), which may be used by the user 110(1) via a secure sign-in process to access various services provided by the payment host 106. The user 110(1) may use payment account identification information (e.g., user name, password, etc.) to securely log into the corresponding payment account of the payment accounts 126. The payment accounts 126 may include without limitation account information, transaction information, payment information, contact information, and so forth of respective users.

The payment server 122 may include one or more processors 124 and memory 128 that stores various modules, applications, programs, or other data. The memory 128 may include instructions that, when executed by the one or more processors in the payment server 122, cause the processors to perform the operations described herein for the payment host 106. In various embodiments, the memory 128 may store an account determination module 130 and a payment processing module 132. In various embodiments, the account determination module 130 may, for example, receive a first network account identification of a user (e.g., user 110(1)) and a second network account identification of a friend of the user 110(1). The account determination module 130 may associate the first network account identification and the second network account identification to a first payment account and a second payment account, respectively, which are used by the user 110(1) and the friend to access the payment host 106. The payment processing module 132 may then transfer funds from the first payment account to the second payment account.

In various embodiments, the client device 106 may render an interface 136, for example, on a client device. The interface 136 may include the interactive content 104 and payment data 138 from the payment server 122. In various embodiments, the payment data 138 may be provided by a payment application via one or more frames (e.g., which are embedded within the interactive content 194). The one or more frames may be, for example, iframes, which may be overlaid with HTML to protect the information in the iframe from access by the content provider 102. At least a part of the payment data 138 may be transmitted between a client device and the payment host 106, by bypassing the content provider 102. The iframes, containing the payment data 138, may be embedded within the interactive content 104. In various embodiments, the iframes, containing the payment data 138, may be triggered by the content provider 102 in response to a user opening the payment application from the interactive content 104. In various embodiments, the one or more frames may exchange commands with a parent page (browser page), such as by using JavaScript. In various embodiments, the one or more frames may have a child/parent relationship with the interactive content 104 (parent). The one or more frames may facilitate communication between the client device and the payment host 106 via the parent (e.g., via the interactive content 104), or may facilitate communication directly between the client device and the payment host 106. The one or more frames may also facilitate displaying the payment data 138 on the corresponding client device. In various other embodiments, the payment application may display the payment data 138 on an interface that is separate from the interface 136 (e.g., the interface displaying the payment data may not be embedded within the interface 136).

In various embodiments, the content provider 102 may generate the interactive content 104 as a part of a social networking service. A user may browse the social networking service, and access a list of friends of the user. The user may desire to transfer funds from the user to a friend included in the list of friends. To initiate the transfer of funds, the user may open the payment application (e.g., managed by the application engine 118) from the interactive content 104. The payment application may, in various embodiments, open one or more frames embedded within the interactive content 104 (or an interface that is external to the interface 136), to enable the user to interact with the payment host 106. The payment application may interact with the payment host 106 (for example, via the one or more frames, or using any other appropriate manner, e.g., as a stand-alone application) to facilitate transfer of funds from a payment account of the user to a payment account of the friend.

In various embodiments, the one or more frames may be embedded with the interactive content 104. As used herein, the term "embedded" describes a status of the payment data 138 in a frame that appears to be in-line with or to be integrated with the interactive content 104, which may be accomplished by overlaying content, attaching content, or otherwise merging the frame and the interactive content 104 in a same location without requiring the user to navigate between pages, windows, screens, or other locations. In various other embodiments, the payment application may not use one or more frames to communicate with the payment server 122. In some of these embodiments, the payment application may, for example, launch an interface that is external to the interface 136 (i.e., not embedded within the interactive content 104), and the payment application may display at least a part of the payment data 138 within this external interface.

Each of the content server 112, the payment server 122, and the client devices 108(1), ..., 108(N) may include one or more processors and memory (e.g., memory 116 included in the content server 112, memory 128 included in the payment server 122, etc.). The memory may include removable storage and/or non-removable storage. Computer-readable media may include volatile and non-volatile, removable, and non-removable media implemented in any method or technology for storage of information, such as computer readable instructions, data structures, program modules, or other data, which may be included in removable storage and in the non-removable storage.

Illustrative Operations

Figure 2:
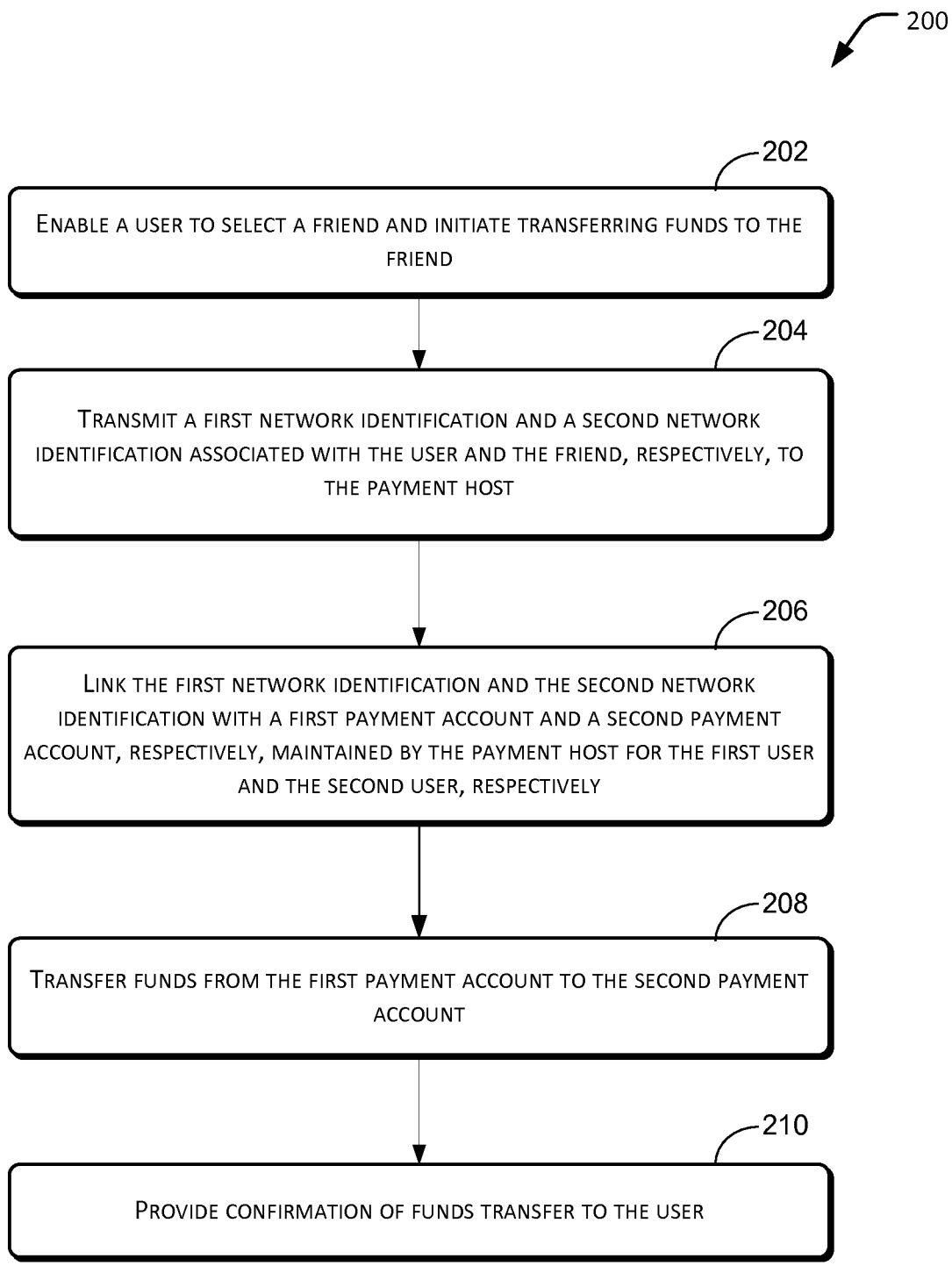
FIGS. 2, 3a and 3b are flow diagrams of illustrative processes to pay a friend using a payment application within the interactive content.
Figure 3A:
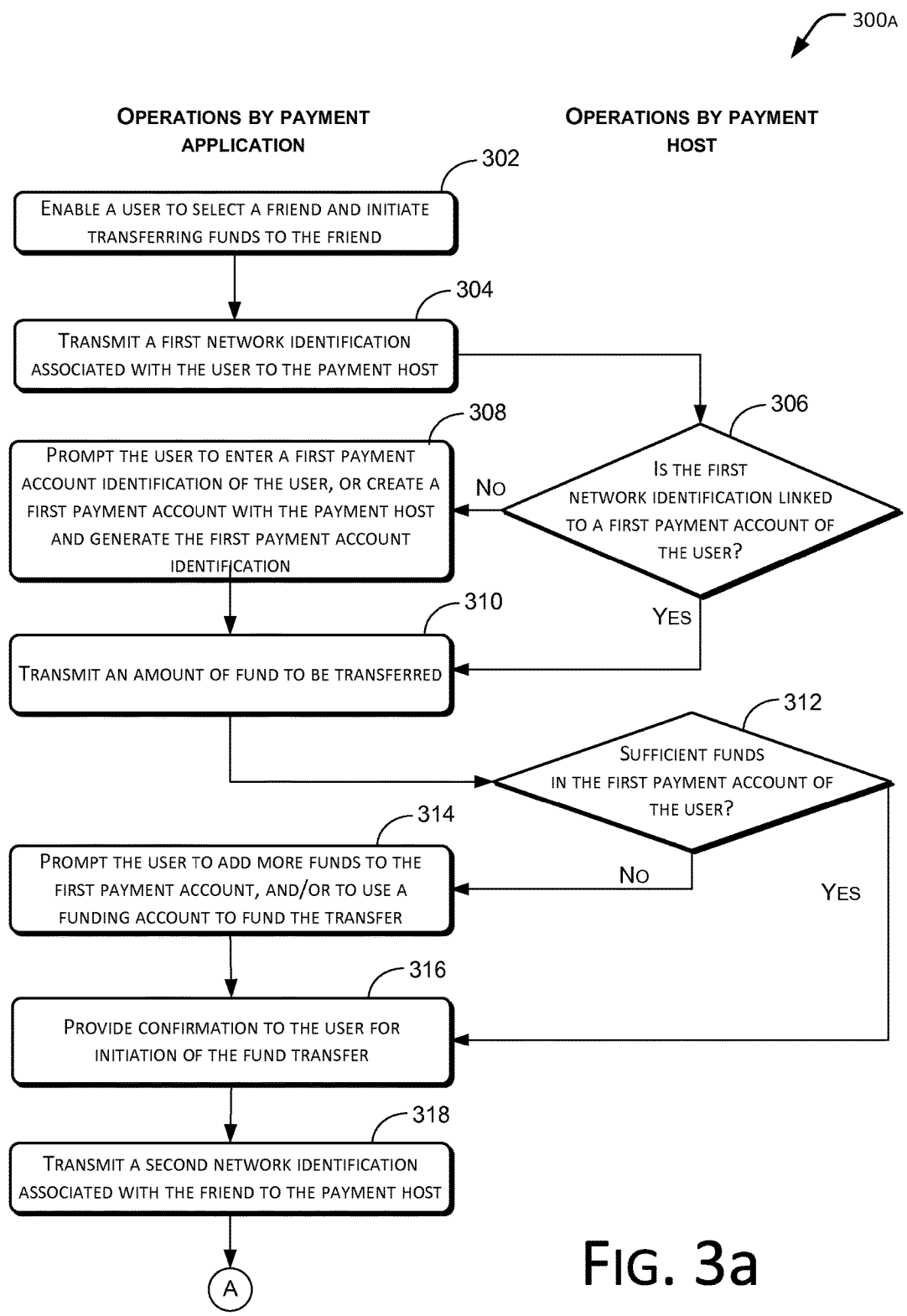
Figure 3B:
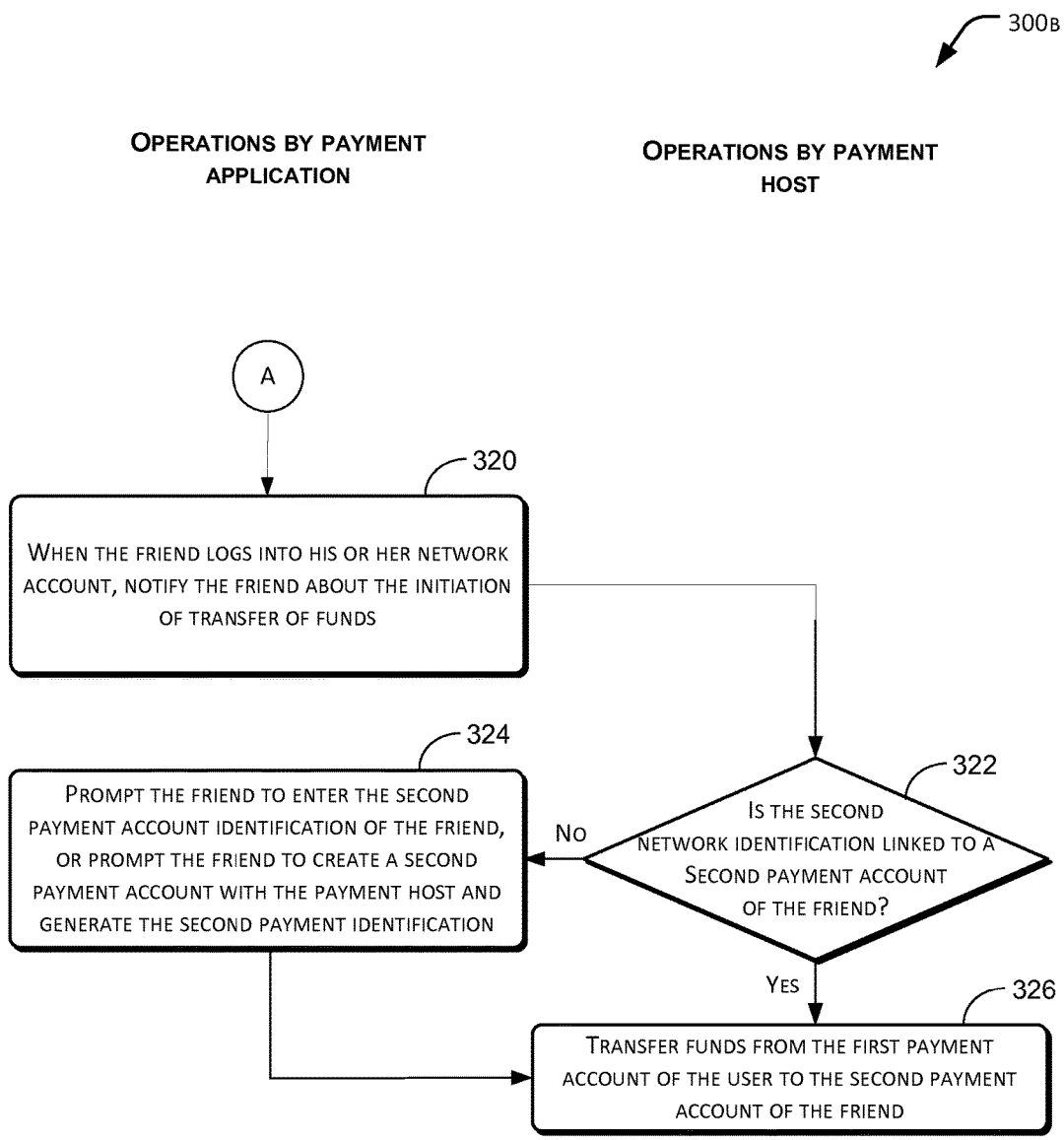

FIG. 2 is a flow diagram of an illustrative process 200 to pay a friend using a payment application within the interactive content 104. FIGS. 3a and 3b are flow diagrams of illustrative processes 300a and 300b, respectively, to pay a friend. FIGS. 4a-4g illustrate user interfaces (e.g., interface 136) displayed on one or more client devices during various operations of the processes 300a and 300b.

The processes 200, 300a and 300b are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to processes 200, 300a and 300b, shall be interpreted accordingly.

Referring again to FIG. 2, at 202, a payment application may enable a user (e.g., user 110(1)) to select a friend from a list of friends and initiate transferring funds to the friend. For example, the client device 108(1) may launch the payment application from within the interactive content 104, in response to the user 110(1) initiating the payment application by opening the payment application from a user interface within the interactive content 104. In various embodiments, the payment application may launch a frame embedded within the interactive content 104, and the frame may provide the user 110(1) with a list of friends, and enable the user to select a friend from this list. In various other embodiments, the payment application may launch an interface external to the interface 136, and the external interface may provide the user 110(1) with a list of friends, and enable the user to select a friend from this list. The selected friend may be one of the users 110(2), ..., 110(N) of FIG. 1 (or any other user who has a network account with the content provider, and who is in the friend's list of the user 110(1)). The user 110(1) may have a first network account with the content provider 102, and the friend may have a second network account with the content provider 102. The user 110(1) and the friend may use a first network account identification and a second network account identification to access their respective network accounts.

At 204, the payment application may transmit the first network account identification and the second network account identification associated with the user and the friend, respectively, to the payment host 106. The payment application may identify the first network account identification and the second network account identification, for transmission to the payment host 106, from the interactive content 104 and/or from the content provider 102.

At 206, the payment host 106 (e.g., the account determination module 130 of FIG. 1) may link the first network account identification and the second network account identification to a first payment account and a second payment account, respectively, maintained by the payment host 106 for the first user and the second user, respectively.

At 208, the payment host 106 (e.g., the payment processing module 132 of FIG. 1) may transfer funds from the first payment account of the user 110(1) to the second payment account of the friend, as requested by user 110(1), and transmit a confirmation to the frame. At 210, the frame 210 may provide confirmation of funds transfer to the user 110(1).

In various embodiments, operations at 202, 204 and 210 of FIG. 2 may be performed by the payment application using a single frame embedded within the interactive content 104. In various other embodiments, each of the operations at 202, 204 and 210 may be performed, for example, using a respective frame embedded within the interactive content 104. In various other embodiments, the operations at 202, 204 and 210 may be performed, for example, using one or more frames embedded within the interactive content 104. In various other embodiments, one or more of the operations at 202, 204 and 210 may be performed, for example, using an interface that is not embedded within the interactive content 104.

Referring again to FIG. 3a, unless otherwise mentioned, operations of blocks illustrated in the left side may be performed by one or more payment applications from within an interface (e.g., interface 136) of a client device of a user (e.g., user 110(1)), and those illustrated in the right side may be performed by the payment host 106.

Figure 4A:
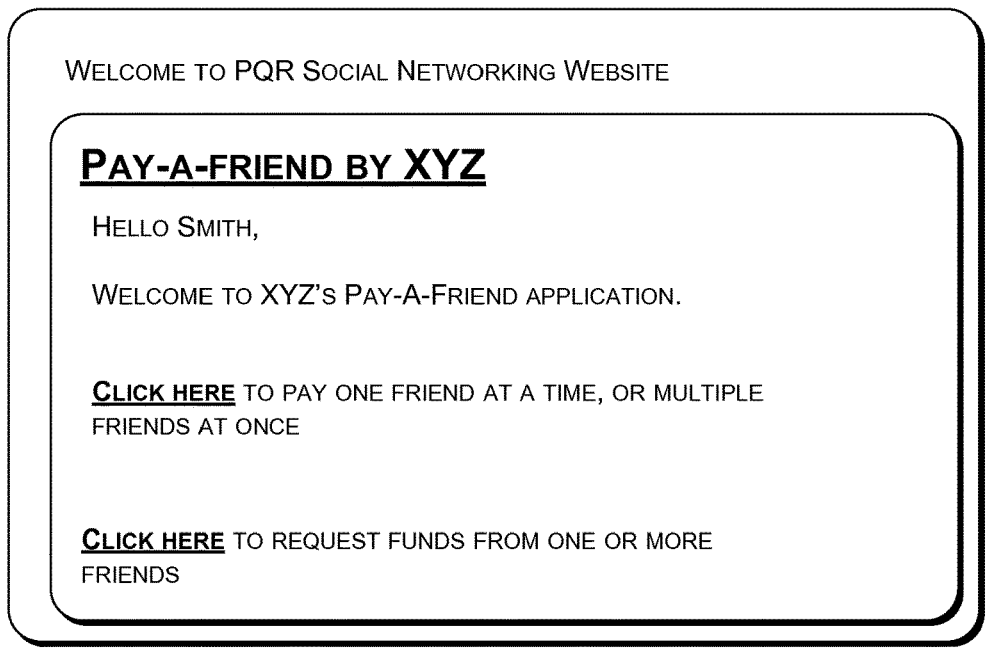
Figure 4B:
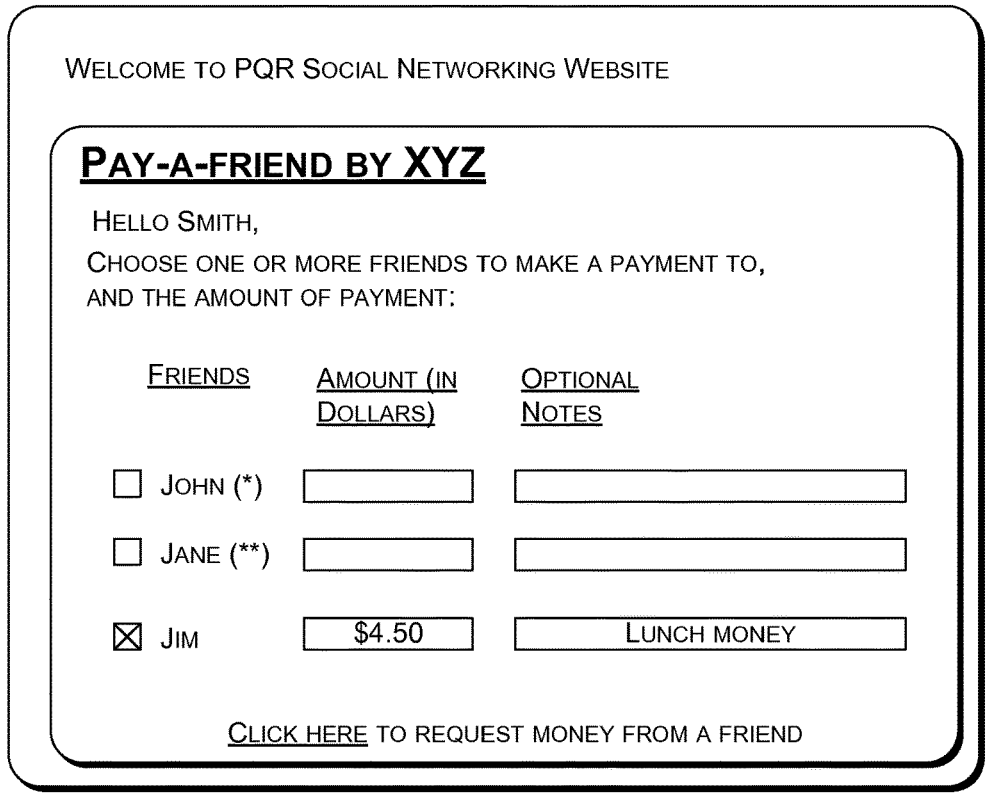

Moving to FIG. 3a, at 302, a payment application within the interactive content 104 in the interface 136 may enable a user (e.g., user 110(1)) to select a friend from a list of friends and initiate transferring funds to the friend. For example, as illustrated in FIG. 4a, the social networking service associated with the content provider 102 named "PQR", and the payment host 106 is hosted by "XYZ Inc". FIGS. 4a-4d and 4f illustrate example interfaces displayed on a client device (e.g., client device 108(1)) of the user 110(1), each of the interfaces comprising (i) interactive content (e.g., interactive content 104) provided by the content provider 102, and (ii) a frame embedded within the interactive content. FIGS. 4e and 4g illustrate example interfaces displayed on a client device of the friend. The user 110(1) in FIGS. 4a-4g is, for example, "Smith", who is provided an option to transfer funds to a friend. In the interface of FIG. 4b, the payment application enables Smith to view a list of friends of Smith (e.g., John, Jane and Jim), and also enables Smith to select Jim to transfer funds (e.g., transfer $4.50). The interface of FIG. 4b may also enable Smith to enter a note, e.g., to indicate that the transfer of funds is associated with "Lunch money," which, for example, Jim may have earlier paid on behalf of Smith.

The user 110(1) may have the first network account with the content provider 102, and the friend may have the second network account with the content provider 102. The user 110(1) and the friend may use the first network account identification and the second network account identification to access their respective network accounts.

Referring again to FIG. 3a, at 304, the payment application may transmit the first network account identification associated with the user 110(1) to the payment host 106. At 306, the payment host 106 may determine if the first network account identification of the user is linked to a first payment account of the user. In various embodiments, the payment host 106 may store a mapping between each of a plurality of payment account identifications and a corresponding network account identification of a plurality of network account identifications, from which the payment host 106 may identify the first payment account identification of the user 110(1) from the first network account identification. In various other embodiments, the content server 102 may store such mapping, and may facilitate the payment host 106 to make the determination at 306.

Figure 4C:
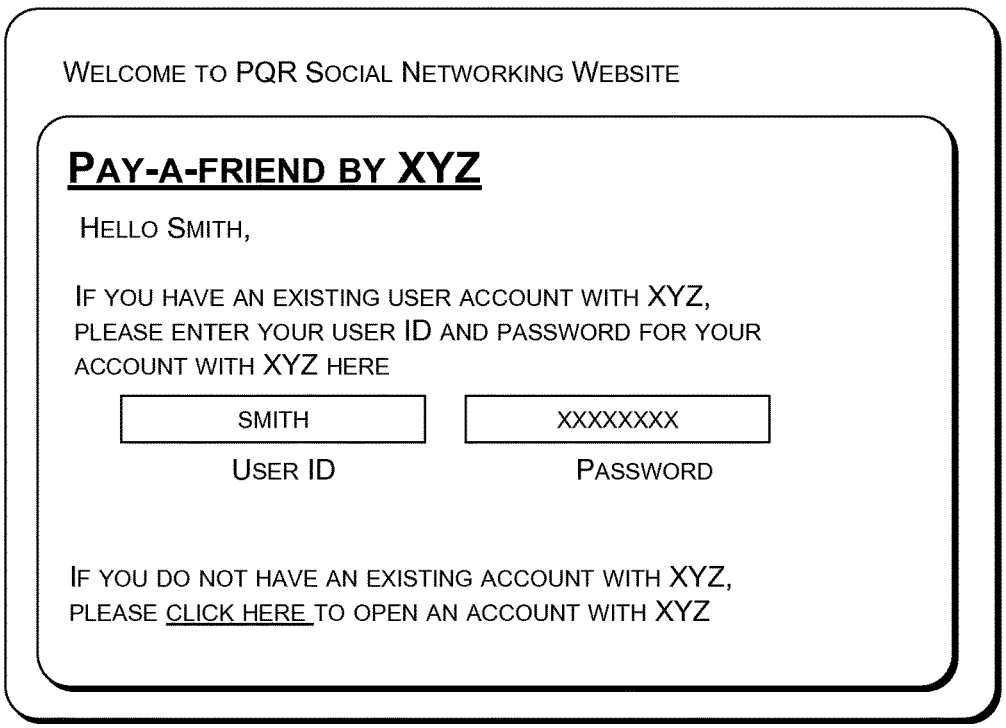
Figure 4D:
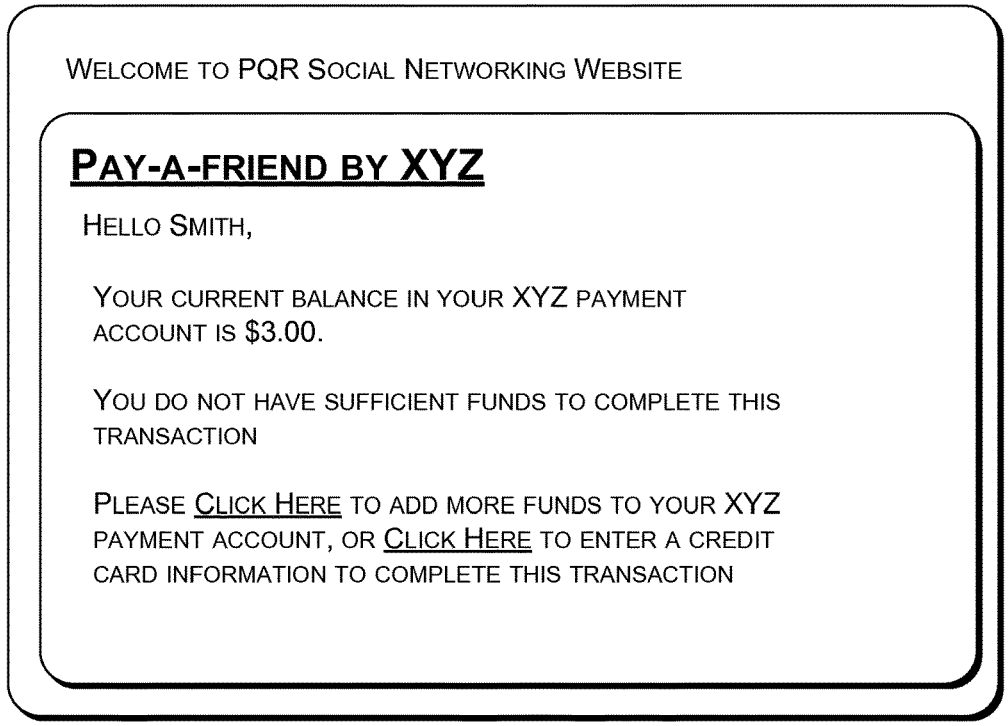
Figure 4E:
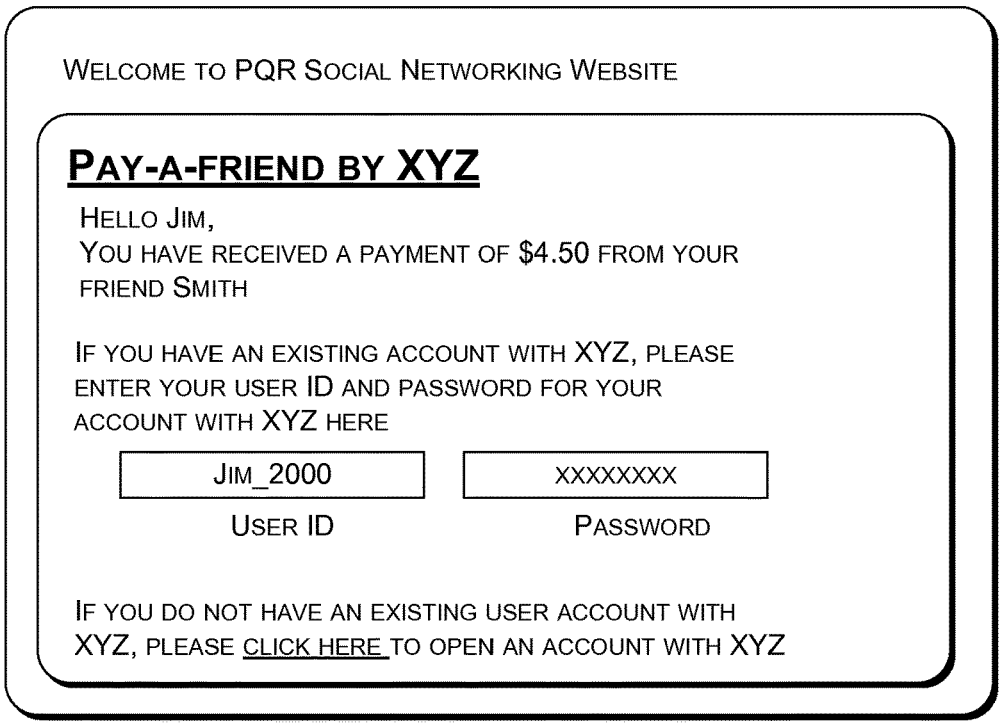

If the payment host 106 is unable to identify the first payment account identification of the user 110(1) from the first network account identification, at 308, the payment application may prompt the user 110(1) to enter a first payment account identification of the user 110(1), as also illustrated in FIG. 4c. If the user 110(1) indicates that the user 110(1) does not have a payment account with the payment host 106 (e.g., if the user selects such option in the interface of FIG. 4c), the payment application may prompt the user 110(1) to create a first payment account with the payment host 106 and to generate the first payment account identification. The user 110(1) may create the payment account from within the frame embedded in the interface 136 (or from an appropriate interface associated with the payment application), or may be directed to a page associated with the payment host 106 to create the payment account.

Subsequent to 308 (or if "Yes" at 306), at 310 the payment application may transmit, to the payment host 106, an amount of fund to be transferred from the user 110(1) to the friend. For example, the payment application may transmit the fund amount of $4.50 that was entered by Smith in the interface of FIG. 4a.

At 312, the payment host 106 may determine if sufficient funds (or a sufficient credit limit) are available in the first payment account of the user 110(1) to complete the funds transfer. If sufficient funds (or a sufficient credit limit) are not available, at 314, the payment application may prompt the user 110(1) to add funds to the first payment account. The user 110(1) may add funds to the first payment account from, for example, a bank account and/or a credit card of the user 110(1). Additionally or alternatively, the payment application may prompt the user 110(1) to directly use a funding account (e.g., the bank account or the credit card account) to fund the transfer. For example, in the interface of FIG. 4D, the payment application enables the user 110(1) (i.e., Smith) to either add funds to his payment account, or use a credit card to complete the fund transfer.

Subsequent to 314 (or if "Yes" at 312), at 316 the payment application may provide a confirmation to the user 110(1) for initiation of the fund transfer. For example, the payment application may indicate to the user 110(1) that the transfer of funds has been initiated, and will be completed in response to the friend accepting the fund transfer request. At 318, the frame may transmit a second network account identification associated with the friend to the payment host 106.

The process 300a of FIG. 3a may continue to the process 300b of FIG. 3b. One or more operations of the process 300b (e.g., operations 320 and 324) may be performed by another payment application that runs within one or more frames that are embedded within interactive content of an interface displayed on a client device of the friend (e.g., to whom the user 110(1) is transferring the funds).

Referring to FIG. 3b, at 320, when the friend logs into his or her network account, the payment application notifies the friend about the initiation of transfer of funds. For example, the payment application may provide the notification using a pop-up window, a message within the interactive content of the interface displayed on the client device of the friend, or the like, to the friend.

At 322, the payment host 106 may determine if the second network account identification of the friend is linked to a second payment account of the friend. As previously discussed, in various embodiments, the payment host 106 (and/or the content provider 102) may store a mapping between each of a plurality of payment account identifications and a corresponding network account identification of a plurality of network account identifications, from which the payment host 106 may identify the second payment account of the friend from the second network account identification.

If the payment host 106 is unable to identify the second payment account of the friend from the second network account identification, at 324, the payment application may prompt the friend to enter a second payment account identification of the friend, e.g., as illustrated in the interface of FIG. 4e. If the friend indicates that the friend does not have a payment account with the payment host 106, the payment application may prompt the friend to create the second payment account with the payment host 106 and generate the second payment account identification, as also illustrated in FIG. 4e. The friend may create the second payment account from within the frame embedded in the interface, or may be directed to a page associated with the payment host 106 to create the payment account.

Figure 4F:
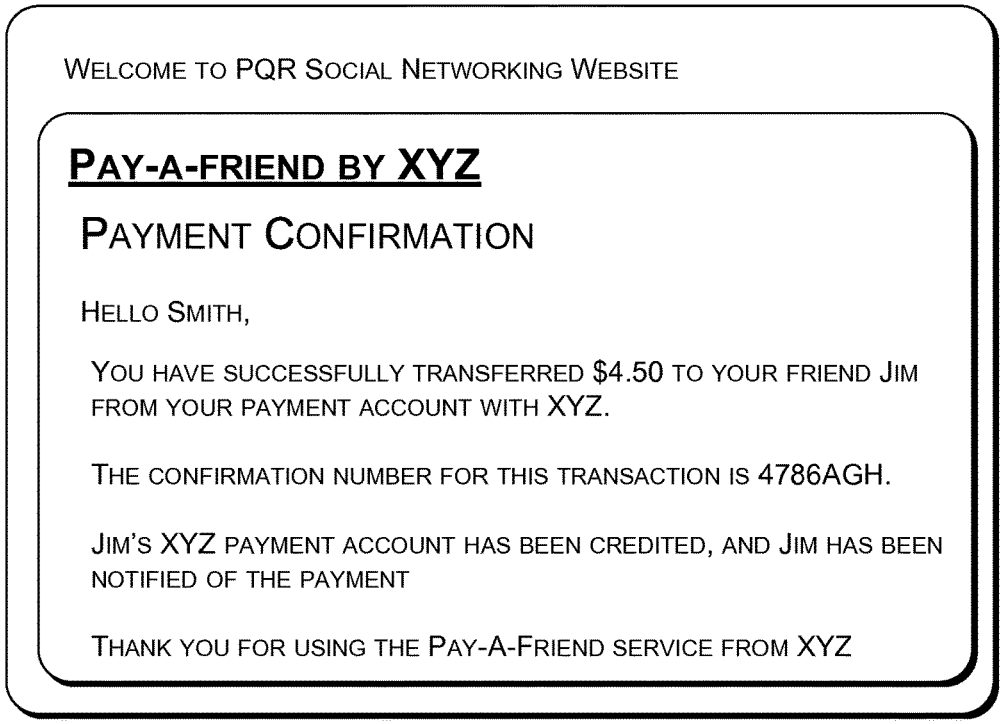

Subsequent to 324 (or if "Yes" at 322), at 326 the payment host 106 may transfer funds from the first payment account of the user to the second payment account of the friend. Although not illustrated in FIG. 3b, subsequent to 326, the user 110(1) and the friend may respectively receive confirmation about the transfer of funds from the first payment account of the user 110(1) to the second payment account of the friend, as illustrated in the interfaces of FIGS. 4f and 4g, respectively.

In various embodiments, the operations of FIGS. 3a and 3b may be performed in an order that is different from the order illustrated in FIGS. 3a and 3b. For example, in FIG. 3a, the first network account identification and the second network account identification are illustrated to be transmitted to the payment host 106 at 304 and 318, respectively. However, in various other embodiments and although not illustrated in FIG. 3a, both the first network account identification and the second network account identification may be transmitted at the same time (e.g., at 304) to the payment host 106. In another example, at 310 of FIG. 3a, the payment application transmits the fund amount to the payment host 106. However, in various other embodiments and although not illustrated in FIG. 3a, the payment application may transmit the fund amount to the payment host 106 at, for example, 304 of FIG. 3a.

In various embodiments and although not illustrated in FIG. 3b, instead of the payment host 106 requiring the friend to have the second payment account with the payment host 106, the payment host 106 may transfer the funds directly to a bank account of the friend. Accordingly, in these embodiments, the operations at 322 and 324 may optionally be bypassed. For example, in these embodiments, the payment application may enable the friend to either (i) identify or create a payment account with the payment host 106, or (ii) directly deposit the funds to a bank account of the friend, without having to identify or create a payment account of the friend with the payment host 106.

In various embodiments, the transfer of funds from the user 110(1) to the friend may be performed without the user 110(1) and/or the payment host 106 being aware of contact details (e.g., an e-mail address, a physical address, a telephone number, and/or the like) and/or a real name of the friend when the transfer is initiated by the user 110(1). For example, the user 110(1) may select the friend from a list of friends in the social networking service, without necessarily knowing the contact details and/or the real name of the friend. As discussed with respect to FIGS. 2, 3a and 3b, the payment application may transmit only a network account identification of the friend, but refrain from transmitting the contact details and/or the real name of the friend to the payment host 106.

In various embodiments, the user 110(1) and the friend may complete the transfer of funds, from the first payment account of the user 10(1) to the second payment account of the friend, from the social networking service associated with the content provider 102. That is, the user 110(1) and the friend may complete the transfer of funds using the payment host 106, without needing to visit the payment page associated with the payment host 106 (i.e., without ever leaving the social networking service).

In various embodiments, the payment host 106 may charge the user 110(1) each time the user 110(1) uses the services of the payment host 106 to transfer funds to one or more friends. In various embodiments, the payment host 106 may reward the user 110(1) for using the services of the payment host 106 to transfer funds to one or more friends. For example, the user 110(1) may accumulate points with the payment host 106 every time the user 110(1) uses the payment host 106 to transfer funds to a friend. For example, an interface of FIG. 4h illustrates Smith being awarded 45 rewards point for transferring $4.50 to his friend using the service of the payment host 106. Once the user 110(1) accumulates sufficient points, the user 110(1) may redeem the points for a gift selected from, for example, a gift catalogue. The gift may be in the form of, for example, gift cards, merchandises, elite status with the payment host 106, fee free (or reduced fee) transfer of funds for a given number of times to one or more friends, etc.

In various embodiments, the interactive content 104 and/or the payment application may identify an upcoming event associated with one or more friends of a user (e.g., user 110(1)). For example, a friend of user 110(1) may have one or more of a birthday, a graduation, a marriage, and/or the like in the next few weeks. The interactive content 104 and/or the payment application may, in response to identifying the event, remind the user 110(1) about the upcoming event, and suggest the user 1101(1) to transfer funds to the friend for the upcoming event. For example, an interface of FIG. 4i illustrates the embedded frame reminding Smith of John's upcoming birthday and Jim's upcoming marriage anniversary, and suggesting Smith to transfer money to one or more of John and Jim.

In various embodiments, the payment host 106 may categorize a user based on a number of times the user has used the payment host 106 to transfer funds to one or more friends. For example, a user who has transferred funds less than 10 times may be categorized as a basic user, another user who has transferred funds between 10-25 times may be categorized as an advanced user, and yet another user who has transferred funds for more than 25 times may be categorized as an elite user. In various embodiments, if a user is in a higher category, the user may have less restriction on using services of the payment host 106 to transfer funds to one or more friends. For example, an elite category user may be allowed to transfer funds at most 20 times each week, with a maximum limit of $500 for each fund transfer; while a basic user may be allowed to transfer funds at most 5 times each week, with a maximum limit of $50 for each fund transfer. Such restrictions on the use of services of the payment host 106 may prevent fraudulent transfer of funds and/or may limit an amount of the fraudulent transfer.

In various embodiments, based on settings configured by a given user in a corresponding network account and/or a payment account, the interactive content 104 and/or the embedded frame may display the category (e.g., basic, advanced, or elite) of the given user in the interface 136 (e.g., so that the user's friends can view the category of the user). In various embodiments, based on settings configured by another given user in a corresponding network account and/or a payment account, the interactive content 104 and/or the embedded frame may display whether the another given user has a payment account set up with the payment host 106 (e.g., so that the another given user's friends can decide on whether to use the payment host 106 to transfer funds to the another given user). For example, in FIG. 4b, the list of friends, which includes John, Jane, and Jim, may include the categorization of the friends and/or the list may be restricted to friends belonging to a particular category or categories. The list of friends may also include an indication of whether the friends have payment accounts or may be restricted to friends that have the payment accounts. For example, FIG. 4b illustrates a single asterisk sign associated with John, which may indicate that John has a payment account with the payment host 106 and John is a basic user with the payment host 106. FIG. 4b also illustrates a double asterisk sign associated with Jane, which may indicate that Jane also has a payment account with the payment host 106 and Jane is an advanced user with the payment host 106. FIG. 4b does not illustrate an asterisk sign associated with Jim, which may indicate that (i) either Jim does not have a payment account with the payment host 106, or (ii) Jim has an account with the payment host 106, but do not want to display such information to his friends.

Although FIGS. 2, 3a and 3b illustrate one or more payment application performing various operations, in various embodiments, the interactive content 104 (e.g., instead of the payment application) may perform these operations. In some of these embodiments, no frames may be embedded in the interactive content 104. In some of these embodiments, the content provider 102 (e.g., instead of the payment application) may transmit and/or receive various information (e.g., associated with transferring the funds from the user 110(1) to the friend) to and/or from the payment host 106.

In various embodiments, a use can transfer funds to more than one friend at once. For example, from the interface illustrated in FIG. 4b, Smith can choose to transfer $3.00 to Jane and $4.50 to Jim. Transferring funds to more than one friend at once may, for example, save time and be convenient to Smith. Transferring funds to more than one friend at once may be carried out in a manner that is at least in part similar to that illustrated in FIGS. 2, 3a, and 3b.

In various embodiments, in addition to or instead of transferring funds to a friend, a use can request funds from one or more friends. For example, in the interface of FIG. 4A, Smith may select the option to request funds from one or more friends (e.g., request $10 from Jane). Such a request may be transmitted to the payment host 106, along with network account identifications of Smith and Jane. The payment host 106 may forward the request to a frame displayed in a client device of Jane. If Jane accepts the request, the payment host 106 may link the network account identifications of Smith and Jane to their respective payment accounts (e.g., as discussed with respect to FIGS. 2, 3a and 3b), and perform transfer of $10 from the payment account of Jane to the payment account of Smith.

In various embodiments and as illustrated in FIG. 1, the interactive content 104 is provided by the content provider 102, and the users 110(1), . . . , 110(N) maintain respective network accounts with the content provider 102. In various other embodiments and although not illustrated in FIG. 1, another content provider (that is different from the content provider 102) may provide another interactive content (that is different from the interactive content 104), and may provide an option to launch the previously discussed payment application within the other interactive content. Once a user runs the payment application from the other interactive content, the user may be enabled to provide his or her network account identification, and initiate transferring of funds, as discussed with respect to FIGS. 2 and 3a-3b.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed, cause one or more processors to perform acts comprising:
    receiving, by a payment host and from a client device associated with a first user, first data including (i) a request to transfer funds from the first user to a second user, and (ii) a first network account identification associated with the first user and a second network account identification associated with the second user, the first data having been transmitted at least partly in response to a first selection received by an application that runs within interactive content presented on the client device, and wherein:
        the interactive content is presented on the client device based at least partly on second data transmitted to the client device by a social network host, wherein the application is included within the interactive content by the social network host, and wherein the application is configured to embed a frame as an iframe in a hypertext markup language (HTML) document that is rendered over the interactive content within the interactive content in response to a second selection received by the application;
        the interactive content is a part of a social networking service associated with the social network host, and configured to (i) maintain, for the first user, a list of friends that includes the second user and (ii) share one or more of interests, pictures, videos or messages with one or more friends in the list of friends,
        the payment host is different from the social networking host, and wherein the transmission of the first data from the client device to the payment host bypasses the social network host,
        the application is configured to cause a display, in response to the second selection and within the interactive content of the social networking service, of (i) the list of friends, (ii) an identification of a first subset of the list of friends, with a visual indication that individual friends in the first subset of the list of friends have a payment account with the payment host associated with the first application, and (iii) an identification of a second subset of the list of friends, with a visual indication that individual friends in the second subset of the list of friends do not have a payment account with the payment host, elect not to disclose a payment account with the payment host, or both, and
        the application is further configured to display, within the interactive content, (i) an identification of a first group in the first subset of the list of friends, with a visual indication that individual friends in the first group in the first subset of the list of friends have a first category of payment account with the payment host, and (ii) an identification of a second group in the first subset of the list of friends, with a visual indication that individual friends in the second group in the first subset of the list of friends have a second category of payment account with the payment host;
    associating a first payment account and a second payment account of the first user and the second user, respectively, with the first network account identification and the second network account identification, respectively; and
    causing, by the payment host, funds to be transferred from the first payment account to the second payment account.

2. The one or more non-transitory computer-readable media of claim 1, wherein the first network account identification and the second network account identification are respectively used by the first user and the second user to access a first social networking account and a second social networking account, respectively.

3. The one or more non-transitory computer-readable media of claim 1, wherein the acts further comprise:
    determining, by the payment host, an inability to locate the first payment account of the first user from the first network account identification; and
    in response to determining the inability to locate the first payment account, transmitting third data to the client device, the third data being configured to cause the application to enable the first user to (i) identify the first payment account of the first user, or (ii) create the first payment account by the first user.

4. The one or more non-transitory computer-readable media of claim 1, wherein the acts further comprise:
    determining an inability to locate the second payment account of the second user from the second network account identification;

in response to determining the inability to locate the second payment account, transmitting third data to the client device, the third data being configured to cause the application to enable the second user to (i) identify the second payment account of the second user, or (ii) create the second payment account by the second user; and receiving, from the client device and via the application, fourth data associated with an identification of the second payment account of the second user, wherein associating the second payment account further comprises associating the second payment account with the second network account identification based on receiving the identification of the second payment account of the second user.

5. The one or more non-transitory computer-readable media of claim 1, wherein the acts further comprise:
crediting the first payment account with one or more reward points, in response to transferring funds from the first payment account to the second payment account; and
enabling the first user to redeem the one or more rewards points.

6. The one or more non-transitory computer-readable media of claim 1,
wherein one or more frames are embedded within the interactive content, the one or more frames provided by the application, the application configured to:
enable the first user to view the list of friends, and
enable the first user to select (i) an amount of the funds and (ii) the second user from the list of friends to transfer the funds from the first user to the second user;
wherein the acts further comprise:
communicating, by bypassing the content provider, with the first application to transfer the funds from the first user to the second user.

7. The one or more non-transitory computer-readable media of claim 6, wherein the one or more frames are presented in an iframe in a hypertext markup language (HTML) document that is rendered over the interactive content.

8. The one or more non-transitory computer-readable media of claim 6, wherein the application is further configured to:
identify an upcoming event associated with another friend from the list of friends;
remind the first user about the upcoming event; and
enable the first user to transfer funds to the another friend for the upcoming event.

9. The one or more non-transitory computer-readable media of claim 8, wherein the upcoming event is one of a birthday, a graduation and a marriage of the another friend.

10. The one or more non-transitory computer-readable media of claim 1, wherein the acts further comprise:
receiving, by the payment host and from the client device via the application, third data including an identification of an amount of the funds to be transferred from the first user to the second user.

11. The one or more non-transitory computer-readable media of claim 1, wherein the acts further comprise:
causing, by the payment host, funds to be transferred from the first payment account to the second payment account, without receiving from the first user an e-mail address of the second user.

12. The one or more non-transitory computer-readable media of claim 1, wherein the payment application is a first payment application, and wherein the acts further comprise:
receiving, from the first payment application, (i) a request by the first user to receive funds from a third user, and (ii) the first network account identification associated with the first user and a third network account identification associated with the third user; and
transmitting, to a second payment application that runs within an interactive content run on a client device of the third user, a request to transfer funds from the third user to the first user.

13. A system comprising:
one or more processors;
memory, communicatively coupled to the one or more processors;
an account determination module stored in the memory and executed on the one or more processors to:
receive, by a payment host and from a client device associated with a first user, first data including (i) a first network account identification of the first user and (ii) a second network account identification of a second user, the first data having been transmitted at least partly in response to a selection received by an application that runs within interactive content presented on the client device, and wherein:
the interactive content being a part of a social networking service and is presented on the client device based at least partly on second data transmitted to the client device by a social network host, and wherein the application is included within the interactive content by the social networking service,
the interactive content including one or more frames that are embedded within the interactive content and populated by the application, and
wherein the application is configured to embed the one or more frames as iframes in a hypertext markup language (HTML) document that is rendered within the interactive content, of (i) a list of friends of the first user, (ii) an identification of a first subset of the list of friends, with a visual indication that individual friends in the first subset of the list of friends have a first category of payment account with a payment host associated with the application, and (iii) an identification of a second subset of the list of friends, with a visual indication that individual friends in the second subset of the list of friends have a second category of payment account with the payment host; and
associate, by the payment host, the first network account identification and the second network account identification to a first payment account and a second payment account, respectively, wherein the first payment account and the second payment account are respectively used by the first user and the second user; and
a payment processing module stored in the memory and executed on the processor to initiate a transfer of funds from the first payment account to the second payment account.

14. The system of claim 13, wherein the first network account identification and the second network account identification are respectively used by the first user and the second user to access a first social networking account and a second social networking account, respectively.

15. The system of claim 13, wherein the account determination module does not receive, from the first user, an e-mail address of the second user.

16. The system of claim 13, wherein the payment processing module is further executed on the one or more processors to:
- credit the first payment account with one or more reward points, in response to transferring funds from the first payment account to the second payment account; and
- transmit third data to the client device, the third data being configured to cause the application to enable the first user to redeem the one or more rewards points.

17. The system of claim 13, wherein the account determination module is executed on the one or more processors to associate the first network account identification to the first payment account by:
- determining an inability to locate the first payment account of the first user from the first network account identification; and
- in response to determining the inability to locate the first payment account, transmitting third data to the client device, the third data being configured to cause the application to request the first user to (i) identify the first payment account of the first user, or (ii) create the first payment account by the first user.

18. The system of claim 13, wherein the account determination module is executed on the one or more processors to associate the second network account identification to the second payment account by:
- determining an inability to locate the second payment account of the second user from the second network account identification; and
- in response to determining the inability to locate the second payment account, transmitting third data to the client device, the third data being configured to cause the application to request the second user to (i) identify the second payment account of the second user, or (ii) create the second payment account by the second user.

19. The system of claim 13, wherein the payment application is configured to display, within the interactive content, an identification of a third subset of the list of friends, with a visual indication that individual friends in the third subset of the list of friends do not have a payment account with the payment host, or elect not to disclose a payment account with the payment host.

20. A method comprising:
- receiving, by a payment host and from a client device associated with a first user, first data including (i) a request to transfer funds from the first user to a second user, and (ii) a first network account identification associated with the first user and a second network account identification associated with the second user, the first data having been transmitted at least partly in response to a selection received by an application that runs within interactive content presented on the client device, and wherein:
  - the interactive content being a part of a social networking service configured to (i) maintain, for the first user, a list of friends that includes the second user and (ii) share one or more of interests, pictures, videos or messages with one or more friends in the list of friends, wherein the interactive content is presented on the client device based at least partly on second data transmitted to the client device by a social network host, and wherein the application is included within the interactive content based at least partly on a second application associated with the payment host and locally executed by the social network host, and
  - the application being configured to embed as one or more iframes in a hypertext markup language (HTML) document that is rendered within the interactive content, (i) the list of friends, (ii) an identification of a first subset of the list of friends, with a visual indication that individual friends in the first subset of the list of friends have a first category of payment account with a payment host associated with the application, (iii) an identification of a second subset of the list of friends, with a visual indication that individual friends in the second subset of the list of friends have a second category of payment account with the payment host associated with the application, and (iv) an identification of a third subset of the list of friends, with a visual indication that individual friends in the third subset of the list of friends do not have a payment account with the payment host, elect to not disclose a payment account with the payment host, or both;
- associating, by the payment host, a first payment account and a second payment account of the first user and the second user, respectively, with the first network account identification and the second network account identification, respectively; and
- causing, by the payment host, funds to be transferred from the first payment account to the second payment account.

21. The method of claim 20, wherein the first network account identification and the second network account identification are respectively used by the first user and the second user to access a first social networking account and a second social networking account, respectively.

22. The method of claim 20, further comprising:
- determining an inability to locate the first payment account of the first user from the first network account identification; and
- in response to determining the inability to locate the first payment account, transmitting to the client device third data configured to cause the application to enable the first user to (i) identify the first payment account of the first user, or (ii) create the first payment account by the first user.

23. The method of claim 20, further comprising:
- determining an inability to locate the second payment account of the second user from the second network account identification;
- in response to determining the inability to locate the second payment account, transmitting to the client device third data configured to cause the application to enable the second user to (i) identify the second payment account of the second user, or (ii) create the second payment account by the second user; and
- receiving, from the application, fourth data including an identification of the second payment account of the second user,
- wherein associating the second payment account further comprises associating the second payment account with the second network account identification based on receiving the identification of the second payment account of the second user.

24. The method of claim 20, further comprising:
crediting the first payment account with one or more reward points, in response to transferring funds from the first payment account to the second payment account; and
enabling the first user to redeem the one or more rewards points.

\* \* \* \* \*